Feb. 22, 1944.  J. F. SEBALD ET AL  2,342,559
MIXING DEVICE FOR WATER TREATING APPARATUS
Filed Nov. 12, 1941   2 Sheets-Sheet 1
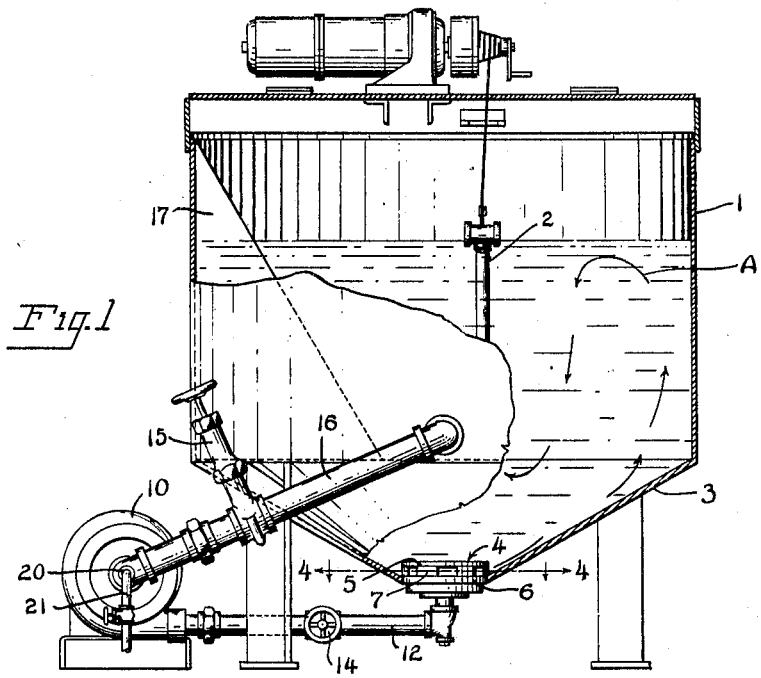
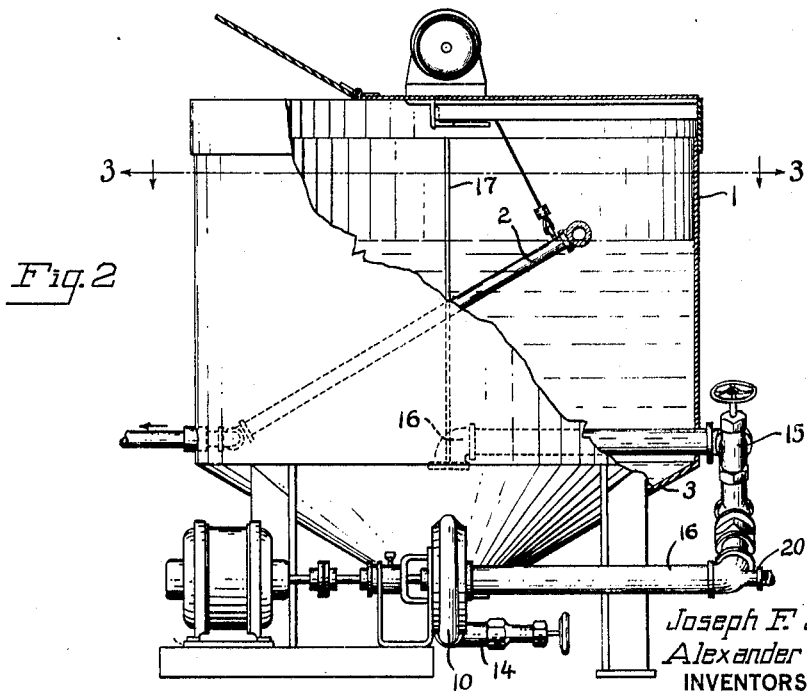
Joseph F. Sebald
Alexander Kazutow
INVENTORS Feb. 22, 1944.   J. F. SEBALD ET AL   2,342,559
MIXING DEVICE FOR WATER TREATING APPARATUS
Filed Nov. 12, 1941   2 Sheets-Sheet 2
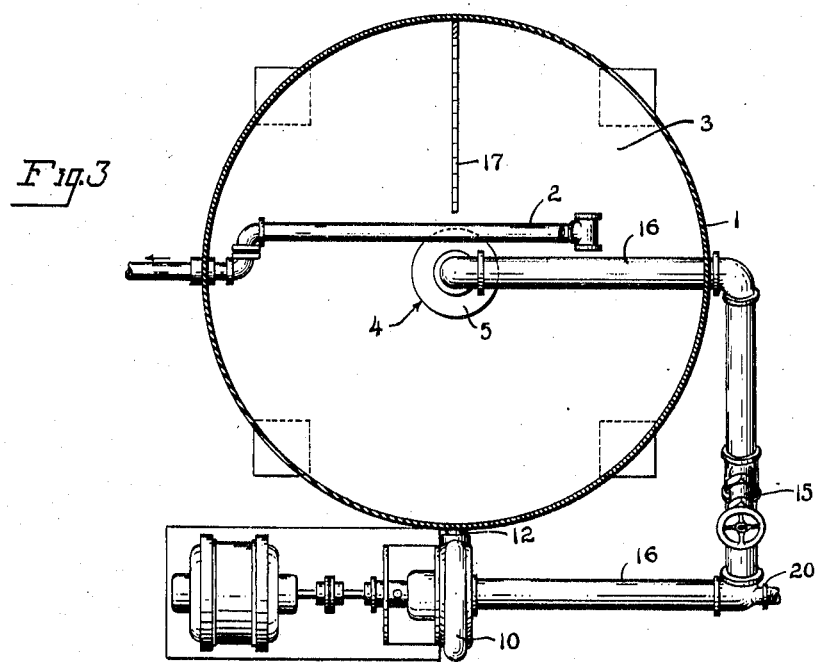
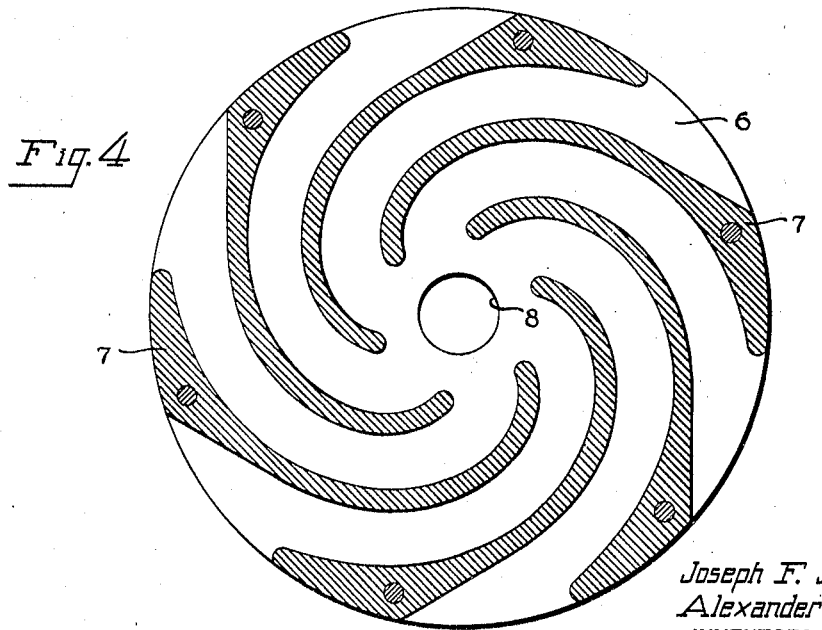
Joseph F. Sebald
Alexander Kazutow
INVENTORS
ATTORNEY Patented Feb. 22, 1944

2,342,559

UNITED STATES PATENT OFFICE 2,342,559

MIXING DEVICE FOR WATER TREATING APPARATUS

Joseph F. Sebald, Arlington, N. J., and Alexander Kazutow, New York, N. Y., assignors to Worthington Pump and Machinery Corporation, Harrison, N. J., a corporation of Delaware Application November 12, 1941, Serial No. 418,692

7 Claims. (Cl. 259—95)

This invention relates to water treatment or softening, and more particularly to an improved chemical mixer employed in the water treatment apparatus for maintaining the chemical mixture at uniformly constant strength for insuring the proper and desired action of the softening reagent employed in the process, at all times.

Heretofore it has been the practice to stir up the mixture of raw water and softening reagent in the chemical mixing tank by mechanical means such as stirrers, mixing paddles or the like, which are rotated or agitated in the mixture. Such devices have many disadvantages from a construction standpoint, and also frequently result in unevenness of mixture and lack of uniformly constant strength of the chemical mixture delivered to the treating apparatus by the reagent proportioner.

The present invention comprises a mixing device which maintains a uniform, constant strength of the mixture of water and reagent through a constant recirculation of the mixture through the mixing tank, keeping the mixture in constant ebullition to prevent settling or localization of the reagent, and utilizing a diffuser in the bottom of the tank which receives the mixture from a circulating pump and discharges it tangentally and radially into the tank to maintain uniform mixture and the invention also embodies means, in the tank, to control rotation of the mixture under action of the diffuser for preventing formation of a vortex in the mixture.

With these and other objects in view, as may appear from the accompanying specification, the invention consists of various features of construction and combination of parts, which will be first described in connection with the accompanying drawings, showing a mixing device for water treating apparatus of the preferred form embodying the invention, and the features forming the invention will be specifically pointed out in the claims.

In the drawings:

Figure 1 is a view, partly in section and partly in side elevation, of the improved mixing apparatus.

Figure 2 is a side elevational view of the apparatus taken at right angles to the view illustrated in Figure 1.

Figure 3 is a horizontal section taken on the line 3—3 of Figure 1.

Figure 4 is a horizontal cross-sectional view through the diffuser taken on the line 4—4 of Figure 1.

Referring more particularly to the drawings, the improved mixing apparatus comprises a tank 1 into which raw water from any suitable source (not shown) is fed, when desired, through the inlet connection 20 and pipe 21, or by any other suitable means. The reagent, such as hydrated lime or other suitable softening reagent, is dumped into the tank 1 and mixed with the raw water therein. The chemical and water thus mixed is then delivered to the water treating apparatus (not shown) by a proportioning mechanism embodying a decanting pipe 2. However, this proportioning apparatus forms no part of the present invention, being the subject matter of a separate application for Letters Patent, Serial No. 416,521, filed October 25, 1941. The present invention deals specifically with the mechanism for maintaining a proper and uniform mixture of the chemical or softening reagent and the raw water in the tank 1.

The bottom of the tank 1, indicated at 3, is substantially in the shape of an inverted cone, tapering downwardly and inwardly towards the vertical axis of the tank 1, so that fluid mixture in the tank will flow toward the center of the bottom of the tank. A diffuser 4 is placed in the center of the inclined bottom of the tank 1, at its apex, and this diffuser comprises upper and lower plates 5 and 6, respectively, which are spaced from each other and which have a plurality of stationary diffuser vanes 7 placed between them.

The diffuser vanes 7 curve tangentially from the perimeter of the discs 5 and 6, inwardly to the inlet opening 8 formed in the lower disc 6, as clearly shown in Figure 4 of the drawings. Thus the fluid mixture entering through this inlet opening 8 is projected from the diffuser 4 in a combined radial and tangential flow from the diffuser and of the interior of the tank 1, setting up a high degree of turbulence in the fluid mixture.

The fluid mixture is taken from the interior of the tank 1 by a pump 10, of any approved construction, from a point within the center of the tank directly above the diffuser 4; that is, from a central point in the tank located so that the suction of the pump 10 cooperating with the discharge of the fluid from the diffuser 4 will set up a complete recirculation of all of the fluid in the tank, much in the path as indicated by the arrows A in Figure 1 of the drawings.

The pump 10 discharges through its discharge pipe 12 into the bottom of the stationary diffuser 4 through the inlet 8. A valve 14 is placed in the discharge line 12 of the pump, while a second valve 15 is placed in the suction pipe 16, permitting manual control of both the suction and discharge pipes 16 and 12 respectively.

The substantially radial and tangential projection of the fluid mixture from the perimeter of the diffuser 4 will cause rotation of the fluid mixture within the tank 1, and a baffle 17 is inserted in the tank, in a vertical position and extending radially from within a short distance of the center of the tank 1 to the wall of the tank. The bottom edge of the baffle 17 is on a line horizontal with the top edge of the inclined bottom of the tank, as illustrated in Figure 1 of the drawings. The baffle 17 is placed within the tank to prevent the formation of a vortex in the fluid under its rotary movement, caused by the diffuser, which vortex would tend to cause localized concentration of the chemical or reagent, preventing uniformity of the fluid mixture desired.

What is claimed is:

1. In a chemical mixer for water treating apparatus, the combination with a mixing tank, of a stationary diffuser at the bottom of said tank, a circulating pump having its suction connected to the interior of the tank upwardly from the diffuser and its discharge connected to said diffuser, said diffuser including a plurality of stationary flow directing vanes for directing fluid into the tank in a flow direction tangentially and radially of the circumference of the diffuser, a radial baffle within said tank for preventing the formation of a vortex in the fluid flow within the tank, and valves in the suction line to and discharge line from said circulating pump.

2. In a chemical mixer for water treating apparatus, the combination with a mixing tank of a stationary diffuser carried by said tank and including a plurality of stationary arcuate flow guiding vanes, said diffuser including upper and lower stationary shroud plates, said lower shroud plate provided with a central inlet opening, said vanes curving away from said inlet opening to the perimeter of the shroud plates for directing fluid into the tank in a flow direction tangentially and radially of the circumference of the diffuser, and means for delivering a fluid to said inlet opening under pressure sufficient to force the liquid through said diffuser and into said tank and radially extending means in said tank to control rotation of the fluid discharged through said diffuser to prevent formation of a vortex in the fluid.

3. In a chemical mixer for water treating apparatus, a cylindrical mixing tank having an inverted conical bottom, a stationary diffuser carried by said tank in the apex of said inverted conical bottom and including a plurality of stationary arcuate flow guiding vanes, said diffuser vanes curving for directing fluid into the tank in a flow direction tangentially and radially of the circumference of the diffuser and against the upwardly inclining inner surface of said inverted conical bottom, a pump having its discharge to said diffuser and its inlet connected to said tank at substantially the axis of the tank and a sufficient distance above said diffuser to provide a recirculation of all the fluid in the tank.

4. In a chemical mixer for water treating apparatus, a cylindrical mixing tank having an inverted conical bottom, a stationary diffuser carried by said tank in the apex of said inverted conical bottom and including a plurality of stationary arcuate flow guiding vanes, said diffuser vanes curving for directing fluid into the tank in a flow direction tangentially and radially of the circumference of the diffuser and against the upwardly inclining inner surface of said inverted conical bottom, a pump having its discharge to said diffuser and its inlet connected to said tank at substantially the axis of the tank and a sufficient distance above said diffuser to provide a recirculation of all the fluid in the tank and a radial baffle in said tank above the top of said inverted conical bottom for controlling rotation of fluid discharged through said diffuser to prevent formation of a vortex in the fluid.

5. In a chemical mixer for water treating apparatus, a cylindrical mixing tank having an inverted conical bottom, a stationary diffuser carried by said tank in the apex of said inverted conical bottom and including a plurality of stationary arcuate flow guiding vanes, said diffuser vanes curving for directing fluid into the tank in a flow direction tangentially and radially of the circumference of the diffuser and against the upwardly inclining inner surface of said inverted conical bottom, a pump having its discharge to said diffuser and its inlet connected to said tank to substantially the axis of the tank and a sufficient distance above said diffuser to provide a recirculation of all the fluid in the tank and a radial baffle in said tank above the top of said inverted conical bottom for controlling rotation of fluid discharged through said diffuser to prevent formation of a vortex in the fluid said baffle gradually decreasing in cross sectional area from its lower edge towards the top of the tank.

6. In a chemical mixer for water treating apparatus, the combination with a mixing tank, of a stationary diffusor at the bottom of said tank, a circulating pump having its suction connected to the interior of the tank upwardly from the diffusor and its discharge connected to said diffusor, said diffusor including a plurality of stationary flow directing vanes for directing fluid into the tank in a flow direction tangentially and radially of the circumference of the diffusor.

7. In a chemical mixer for water treating apparatus, the combination with a mixing tank, of a stationary diffusor at the bottom of said tank, a circulating pump having its suction connected to the interior of the tank upwardly from the diffusor and its discharge connected to said diffusor, said diffusor including a plurality of stationary flow directing vanes for directing fluid into the tank in a flow direction tangentially and radially of the circumference of the diffusor, and a valve for controlling the quantity of liquid recirculated by the recirculating pump.

JOSEPH F. SEBALD.
ALEXANDER KAZUTOW.